United States Patent [19]

Lui et al.

[11] Patent Number: 5,337,413
[45] Date of Patent: Aug. 9, 1994

[54] ENVIRONMENT MONITORING SYSTEM FOR STANDARD INTERFACE BUS COMPUTER SYSTEMS

[75] Inventors: Albert Lui; William T. Fuller, both of San Jose, Calif.

[73] Assignee: Tandem Computers Incorporated, Cupertino, Calif.

[21] Appl. No.: 831,951

[22] Filed: Feb. 6, 1992

[51] Int. Cl.$^5$ .............................................. G06F 11/30
[52] U.S. Cl. ............................ 395/275; 364/550; 364/DIG. 1; 364/221.7; 364/238.3; 364/238.2
[58] Field of Search ............ 395/200, 275, 325, 575; 364/550, 551.01, 556

[56] References Cited

U.S. PATENT DOCUMENTS

| | | | |
|---|---|---|---|
| 4,545,011 | 10/1985 | Lyon et al. | 395/200 |
| 4,545,013 | 10/1985 | Lyon et al. | 395/200 |
| 4,751,648 | 6/1988 | Sears, III et al. | 364/550 |
| 4,779,190 | 10/1988 | O'Dell et al. | 395/500 |
| 4,823,290 | 4/1989 | Fasack et al. | 364/550 |
| 5,109,486 | 4/1992 | Seymour | 395/200 |

Primary Examiner—Debra A. Chun
Attorney, Agent, or Firm—Graham & James

[57] ABSTRACT

An apparatus and method for monitoring the environment of remote components attached to a host processor by means of a standard interface bus having a limited number of address ports. The invention includes a host adapter incorporating a standard bus repeater component and an environment monitoring component. The environment monitoring component has a standard bus interface and is selectably coupled to the standard interface bus, and hence to a host processor. The host interface transceiver is coupled by means of a standard bus to the host processor, and is also selectably coupled to a drive interface transceiver by means of the standard bus. The drive interface transceiver is coupled by the standard bus to one or more storage devices. The host adapter is selectably switchable between two modes, such that either the drive interface transceiver is coupled through the host interface transceiver to the host processor, or the environment monitoring component is coupled to the host processor. The inventive system reduces the overhead of an environment monitoring system in terms of address ports on a standard bus having a limited number of address ports. In addition, the bus repeater component of the inventive system permits doubling the cable length limit imposed on certain standard buses, thereby permitting more remote location of one or more storage devices from a host processor.

36 Claims, 3 Drawing Sheets

ENVIRONMENT MONITORING SYSTEM FOR STANDARD INTERFACE BUS COMPUTER SYSTEMS

BACKGROUND OF THE INVENTION

1. Field of the Invention

This invention relates to computer systems, and more particularly to an apparatus and method for monitoring the environment of remote components attached to a central processor by means of a standard interface bus.

2. Description of Related Art

Modern computer systems often use a standard interface bus, such as the well-known Small Computer System Interface ("SCSI") bus, to link a processor unit to a variety of devices, especially storage devices such as optical and magnetic disk drives, and tape drives. Very often, the storage devices are housed in an enclosure that is physically remote from the enclosure housing the central processor. One example is a large database computer system that has many storage units coupled to a single processor unit. In such a case, it is impractical to package the storage units and the host processor in one physical enclosure. Another example of a remote connection between a host and storage devices are systems that locate storage devices in a secured environment, away from the host processor and users, for increased physical security of the information within the storage devices.

Although such storage devices are located remotely from the host processor, it is still desirable to monitor the operating environment of the storage devices, particularly in fault-tolerant computing applications. For example, it is important to know the ambient temperature of a storage device enclosure and the operational status of supporting components, such as the power supply and cooling fans. In a storage device "farm" or array environment, where there may be tens or hundreds of storage devices, it is desirable to provide an indicator (such as a signal light or audio alarm) to identify a failed device to maintenance personnel. Environment sensing circuitry is known in the art. One example is set forth in co-pending U.S. patent application Ser. No. 07/806,603 entitled "ENVIRONMENT SENSING/CONTROL CIRCUIT", assigned to the assignee of the present invention.

Since the environment functions described above relate to the operating condition of a group of storage devices, such information is not generally available from commercial storage devices, particularly those using a standard interface bus. In particular, such information is not available from commercial SCSI-based storage devices. Therefore, an environment monitoring system is needed in the enclosures of the remote, standard bus storage devices to monitor the local environment, and to communicate status information about the environment back to a host processor.

One possible way of accomplishing this function is to add a maintenance bus between the host processor and the environment monitoring system. For example, the well-known RS-232 serial bus interface could be used to connect a host processor to an environment monitoring system. Environment information, such as out-of-bounds temperature status and power status, would be sent from the environment monitoring system to the host over the maintenance bus. One disadvantage of this solution is the cost of adding a specialized maintenance bus to an otherwise standard computer system. The overhead of an extra maintenance bus becomes significant when the computer system includes tens or hundreds of storage devices.

Another possible solution is to treat the environment monitoring system as a standard bus device, and to communicate environment information between the environment monitoring system and the host processor using the protocol of the standard bus. Thus, no extra maintenance bus need be added to the system. This solution is attractive for small database applications in which only a few standard-bus storage devices are needed. However, this solution requires that the environment monitoring system take up one address port on the standard bus. When a standard bus having a limited number of address ports (e.g., the SCSI bus)is used, this solution presents an overhead problem. For example, there are only 8 address ports per standard SCSI bus. In fault-tolerant computing environments, there would be 2 host processors, leaving only 6 device addresses available. Assigning 1 of the 6 SCSI device addresses to an environment monitoring system incurs a 16% overhead. This overhead becomes significant in large database applications with tens or hundreds of SCSI devices. For SCSI-bus systems using the new "wide SCSI" buses, 16 addresses are allowed. The address overhead in such systems is thus 1 of 14, or about 7%. The 7% address-port overhead imposed by an environment monitoring system might be acceptable when the wide SCSI bus is needed for performance reasons, rather than just for environment monitoring reasons. However, at present, very few storage devices use the wide SCSI bus. Consequently, this latter solution is more theoretical than practical at present.

Therefore, there is a need for providing an environment monitoring system that can communicate with a host processor without requiring a dedicated address port on a bus having a limited number of address ports. The present invention provides an apparatus and method for meeting this need.

SUMMARY OF THE INVENTION

The invention comprises a host adapter incorporating a standard bus repeater component and an environment monitoring component. The environment monitoring component has a standard bus interface and is selectably coupled to the standard interface bus, and hence to a host processor. The host interface transceiver is coupled by means of a standard bus to the host processor. The host interface transceiver is also selectably coupled to a drive interface transceiver by means of the standard bus. The drive interface transceiver is coupled by the standard bus to one or more storage devices.

The host adapter is selectably switchable between two modes, such that either the drive interface transceiver is coupled through the host interface transceiver to the host processor, or the environment monitoring component is coupled to the host processor. In the first mode, using a single host processor, up to 7 storage devices can be attached to the host processor on a standard SCSI bus. In the second mode, the host processor is coupled only to the environment monitoring component. Control signals provide for switching between the two modes.

The inventive system reduces the overhead of the environment monitoring system in terms of address ports on a bus having a limited number of address ports. In addition, the bus repeater component of the inventive system permits doubling the cable length limit imposed on certain standard buses, thereby permitting more remote location of one or more storage devices from a host processor.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

The invention is based on the assumption that communication between a host processor and the environment monitoring system host adapter need only occur sparingly and infrequently. This assumption is especially valid for modern devices, which have very high reliability. Therefore, communication should be limited to error reporting and exception processing. This approach results in low system overhead on the host processor for monitoring environment functions.

Although the invention can be applied to any bus having a limited number of address ports, for purposes of illustration only, portions of the following description of the invention will use the standard SCSI bus as an example.

General Structure of the Invention

Figure 1:
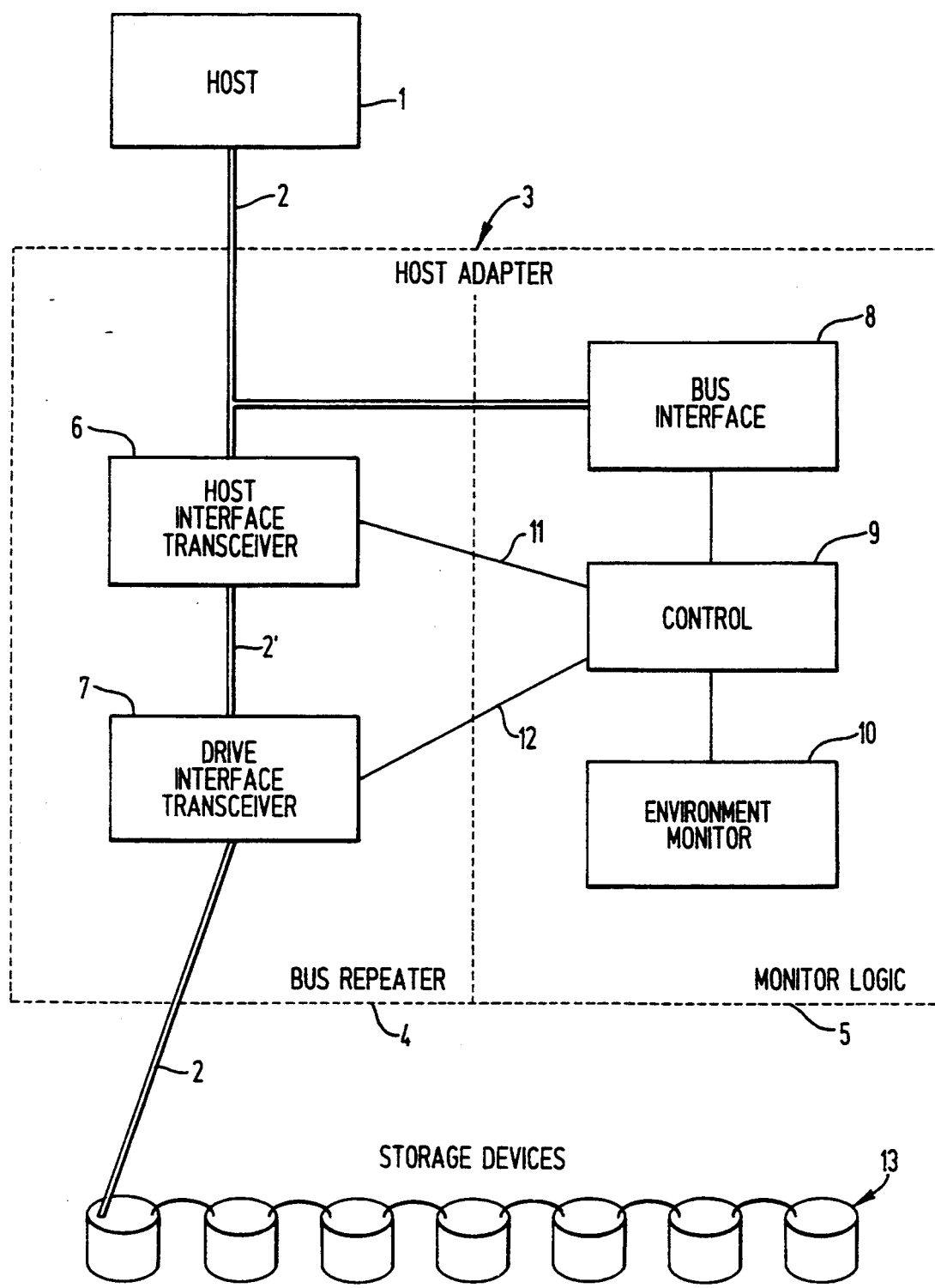
FIG. 1 is block diagram of a single-host processor version of the preferred embodiment of the present invention.

FIG. 1 is block diagram of a single-host processor version of the preferred embodiment of the present invention. A host processor 1 is coupled by means of a standard interface bus (e.g., SCSI bus) 2 to a host adapter 3. The host adapter 3 includes a bus repeater 4 and monitor logic 5.

The bus repeater 4 includes a host interface transceiver 6 coupled to the host processor 1 by the interface bus 2. The host interface transceiver 6 is also coupled to a device interface transceiver 7 by means of an internal bus 2'. (The internal bus 2' is preferably the same as the standard interface bus 2 coupling the host processor 1 to the host interface transceiver 6. However, a non-standard internal bus could be used, if desired, since no external circuitry is coupled to the internal bus 2'.) The drive interface transceiver 7 is in turn coupled by the standard interface bus 2 to at least one storage device 13.

When using a SCSI bus as the interface bus 2, the host interface transceiver 6 and the drive interface transceiver 7 can both be either differential or single-ended transceivers, as specified by the ANSI SCSI standard. Alternatively, a combination of transceivers can be used. For example, the host interface transceiver 6 may be a differential transceiver, and the drive interface transceiver 7 may be a single-ended transceiver. Such bus transceivers are well-known in the art, and are available in integrated circuit form.

The monitor logic 5 includes a bus interface unit 8 which is coupled to the standard interface bus 2 coupling the host processor 1 to the host interface transceiver 6. The bus interface unit 8 is also coupled to a control unit 9, which in turn is coupled to an environment monitor unit 10. The control unit 9 is also coupled to both the host interface transceiver 6 and the drive interface transceiver 7 by respective control lines 11, 12.

The environment monitoring unit 10 may comprise any desired environment monitoring circuitry. Such circuitry may simply be able to detect ambient temperature within an enclosure housing the storage devices 13, or the power on/off status of the storage devices 13, or other desired environmental factors. One example of an environment sensing circuit is shown in co-pending U.S. patent application No. 07/806,603, entitled "ENVIRONMENT SENSING/CONTROL CIRCUIT", assigned to the assignee of the present invention. In general, the environment monitoring unit 10 will have a set of Read and Write registers to store the status of a variety of environmental characteristics and pre-set comparison values from the host processor 1.

In the configuration shown in FIG. 1, the host adapter 3 provides an enhancement to the normal method of connecting a host processor 1 to the storage devices 13 when using certain standard buses. For example, one troublesome characteristic of present SCSI bus systems is that the bus cable length is severely limited when multiple devices are attached to the same bus. The connectors and the stub lengths of these attached devices can cause discontinuities and signal distortion on the bus. By providing the bus repeater 4 within the host adapter 3, the incoming bus 2 from the host processor 1 is properly terminated, as is the outgoing bus 2 to the storage devices 13. Consequently, all signals are re-shaped before being transferred from the incoming bus to the outgoing bus, and vice versa. By providing this bus repeater function, the invention permits extension of a SCSI bus to twice the cable length limit imposed by the ANSI standard for the SCSI bus.

Modes of Operation

The host adapter 3 is selectably switchable between two modes of operation. In the "Bypass Mode" the drive interface transceiver 7 is coupled through the host interface transceiver 6 to the host processor 1. In the "Monitor Mode", the monitor logic 5 is coupled to the host processor 1.

During normal operation of the system, the host processor 1 communicates in the Bypass Mode to the storage devices 13 through the host interface transceiver 6 and the drive interface transceiver 7. As noted above, the use of the host adapter 3 permits the total length of the interface bus 2 to be double the length limit normally allowed to couple a host processor directly to one or more storage devices. In the Bypass Mode, both the host interface transceiver 6 and the drive interface transceiver 7 are enabled, and the bus interface unit 8 in the monitor logic 5 is disabled. Hence, environment conditions detected by the environment monitoring unit 10 cannot be communicated to the host processor 1.

The control unit 9 monitors messages from the host processor 1 transmitted on the interface bus 2, as well as status signals from the environment monitoring unit 10, for exception conditions. Examples of exception conditions are:

1. A Reset Signal from the host processor 1 (optionally followed by a "Monitor Mode" command);
2. "Power up" of the entire system;
3. Abnormal environment conditions detected by the environment monitoring unit 10 (such as the ambient temperature being out of range).

The Reset Signal is a standard command for SCSI buses, and is commonly available for other standard buses. Alternatively, the host processor 1 may assert a special command signal on a reserved signal line in the standard bus (the standard SCSI bus has a number of available reserved signal lines).

When either exception condition 1 or 2 occurs, the control unit 9 causes the host adapter 3 to switch from Bypass Mode to Monitor Mode. That is, if the control unit 9 receives a Reset Signal from the host processor 1, or detects that power has been applied to the host adapter 3, the control unit 9 sends an enable signal to the bus interface 8, and disable signals to the host interface transceiver 6 and the drive interface transceiver 7 via respective control lines 11, 12. Thus, in the Monitor Mode, the only bus communication is between the host processor 1 and the bus interface unit 8, over the connecting interface bus 2.

In the Monitor Mode, environment information may be communicated between the host processor 1 and the environment monitoring unit 10 through the bus interface 8. Such information may include, for example, environment limits specified by the host processor 1 and stored in registers within the environment monitoring unit 10. (For example, a control program running on the host processor 1 may specify that the ambient temperature within a particular storage device enclosure should not exceed a desired value; this value may vary from enclosure to enclosure). Environment status information detected by the environment monitoring unit 10 may be communicated back to the host processor 1. All communication is by means of the standard protocol associated with the interface bus 2.

After communicating all necessary information between the host processor 1 and the monitor logic 5, the host processor 1 sends a "Disconnect" command to the bus interface unit 8 in the host adapter 3. This command is passed to the control unit 9, which switches the host adapter 3 from Monitor Mode back to Bypass Mode.

In implementing the invention using the SCSI bus, special care should be taken by the host processor 1 to ensure that all outstanding SCSI commands are completed before switching the host adapter 3 from Bypass Mode to Monitor Mode, since a standard Reset Signal on the SCSI bus will terminate all operations on all attached storage devices 13. For systems having dual host processors, messages should be sent between the host processors to ensure a quiescent bus before switching from Bypass Mode to Monitor Mode.

For systems where the host processor 1 cannot ensure that all outstanding SCSI commands are completed before issuing a Reset Signal, the invention provides an alternative method in which a Reset Signal from the host processor 1 is delayed within the host adapter 3 before being passed to the storage devices 13. In the preferred embodiment, the reset signal line of the interface bus 2 is not directly coupled between the host processor 1 and the storage devices 13. Instead, the host adapter 3 monitors the reset signal line from the host processor 1. If a Reset Signal from the host processor 1 is followed by an immediate "Monitor Mode" command within a pre-determined time, the host adapter 3 switches into Monitor Mode, but leaves the storage devices 13 on hold for unfinished commands. After the monitoring functions of the Monitor Mode are complete, the host adapter 3 is switched back to the Bypass Mode, and the outstanding SCSI commands then resume execution.

A Reset Signal from the host processor 1 with no "Monitor Mode" command following within the prescribed time period indicates a true Reset Signal. Consequently, the host adapter 3 asserts a Reset Signal on the reset signal lines coupled directly to the storage devices 13 after the expiration of the pre-determined time period. In this implementation, environment status communication between the monitor logic 5 and the host processor 1 occurs on a time-sharing basis with the normal operation of the bus linking the host processor 1 and the storage devices 13. As such, each host processor-to-monitor logic communication must complete in a specified time that is less than the command time-out limit of the storage devices 13.

The above-described configuration is adequate to handle all communications initiated by the host processor 1 related to environment functions. However, it is sometimes necessary to have the host adapter 3 initiate communications to the host processor 1 to signal abnormal environment conditions (such as power supply or cooling system failure). The invention provides for three alternative methods of permitting such communications.

In the first method for initiating a switch from Bypass Mode to Monitor Mode, the host processor 1 recurringly polls the host adapter 3, to permit communication from the environment monitoring unit 10 of abnormal environment conditions. Under this method, the host processor issues a Reset Signal on the interface bus 2, followed by a "Monitor Mode" command. The Reset Signal and "Monitor Mode" command are detected by the control unit 9, which causes the host adapter 3 to switch from the Bypass Mode to the Monitor Mode for each polling operation.

Although this first method works adequately for many computer systems, in some circumstances polling may not occur frequently enough to detect important changes in environment conditions. Further, since error conditions occur sparingly and infrequently in present day storage systems, it can be a waste of system resources to poll the monitor logic 5 of the host adapter 3 unnecessarily. Hence, it is desirable to report changes in the monitored environment only as they occur.

The second method for initiating a switch from Bypass Mode to Monitor Mode is for the control unit 9, upon the occurrence of an abnormal environment condition detected by the environment monitoring unit 10, to signal the drive interface transceiver 7 to generate a "parity error" signal on the interface bus 2 coupled to the storage devices 13. The active storage device 13 will detect the parity error, causing the storage device 13 to return a "Check Condition" message to the host processor 1 by normal communication. The host processor 1 then switches the host adapter 3 from Bypass Mode into Monitor Mode to verify the source of the "Check Condition" status. The host adapter 3 returns the environment status if an environment error condition exists, and the control unit 9 had been forcing the parity error on the interface bus 2. If no abnormal environment condition existed, and/or the control unit 9 was not causing the forced parity error on the interface bus 2, the host adapter 3 sends a "No Error" status message to the host processor 1. This message would be an indication to the host processor 1 that the parity error was genuine, and not forced by the host adapter 3.

A third method for switching the host adapter 3 from Bypass Mode to Monitor Mode is to have the control unit 9 assert a "Check Condition" status signal on a reserved signal line of the interface bus 2 coupled to the host processor 1. Such a signal is asserted whenever the control unit 9 detects an abnormal environment condition, as determined by the environment monitoring unit 10. When the host processor 1 receives such a signal, the host processor 1 switches the host adapter 3 from Bypass Mode to Monitor Mode by asserting a Reset Signal.

Detailed Structure of Host Adapter

Figure 2:
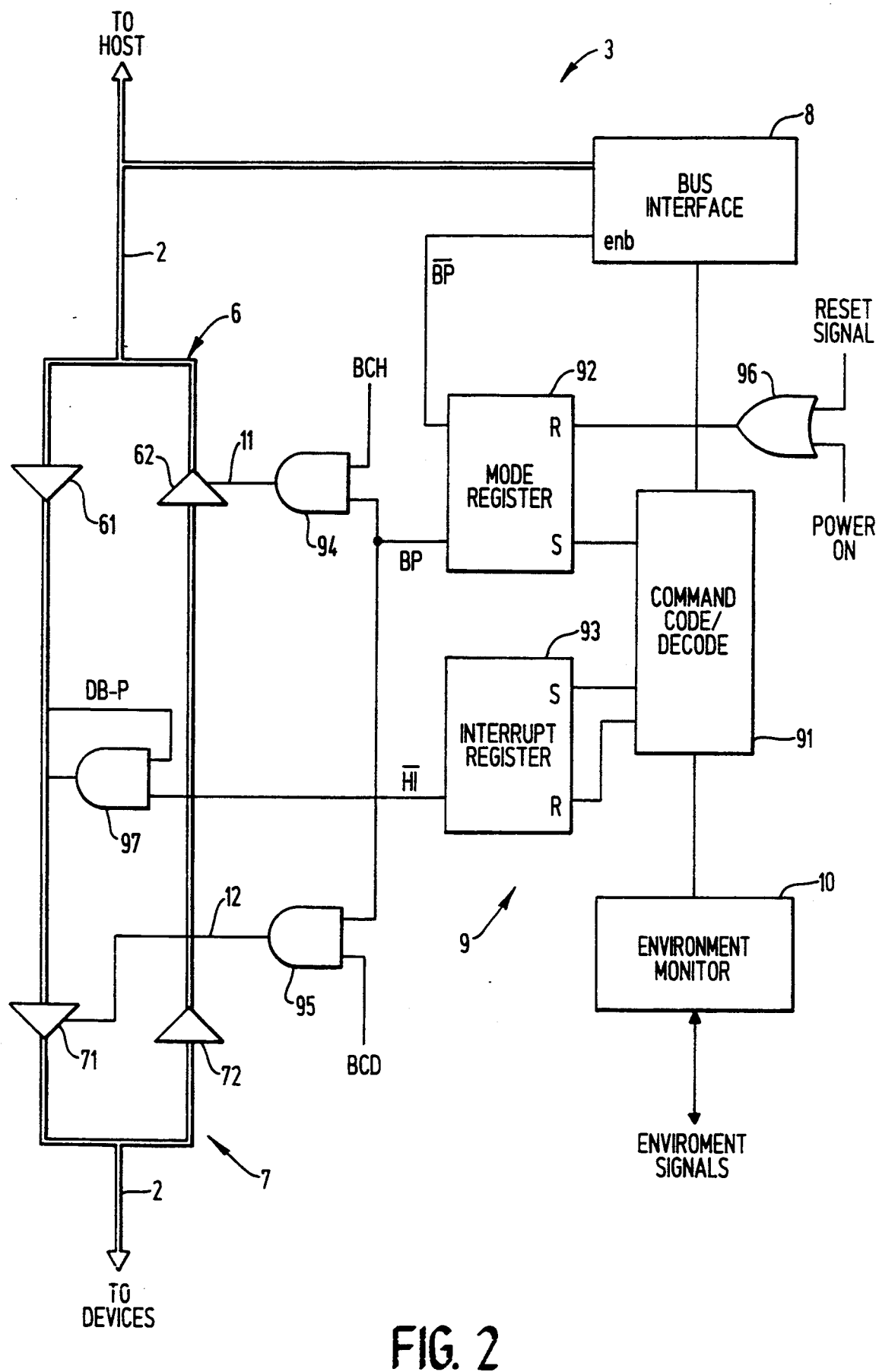
FIG. 2 is a detailed block and schematic diagram of the host adapter shown in FIG. 1.

FIG. 2 is a detailed block and schematic diagram of the host adapter 3 described generally above. The host interface transceiver 6 includes host-side bus drivers 61 and 62. The drive interface transceiver 7 includes drive-side bus drivers 71 and 72. The control unit 9 includes a command code/decode circuit 91, a mode register 92, an interrupt register 93, a host control AND gate 94, a drive control AND gate 95, a mode set OR gate 96, and a parity control AND gate 97.

In the Bypass Mode, the mode register 92 is "set", such that the output signal BP is a logical "1". This signal is coupled to the host control AND gate 94 and the drive control AND gate 95. A bus control-host signal BCH and a bus control-drive signal BCD, generated in known fashion, control the direction of flow of information along the interface bus 2 by enabling or disabling the respective host-side bus driver 62 or device-side bus driver 71.

If a Reset Signal (generated in either way discussed above) or a Power On signal is received as an input to the mode set OR gate 96, the mode register 92 is "reset", thereby disabling the host interface transceiver 6 and the drive interface transceiver 7, and enabling the bus interface 8. This places the host adapter 3 into the Monitor Mode. Command packets can then flow between the host and the bus interface 8, which couples such packets to the command code/decode 91. Both the bus interlace 8 and the command code/decode circuit 91 are well-known in the prior art, particularly with respect to the SCSI bus.

The command code/decode circuit 91 is coupled to the environment monitoring unit 10, which in turn is coupled to individual transducers and sensors that generate environment signals indicative of the state of the monitored environment.

If the second method for switching the host adapter 3 from Bypass Mode to Monitor Mode is used, on detecting an abnormal environment condition, the environment monitoring unit 10 sends a signal to the command code/decode circuit 91. The command code/decode circuit 91 then "sets" the interrupt register 93. The parity control AND gate 97 is coupled to and controls the parity signal line of the interface bus 2. In normal operation, the host interrupt signal $\overline{HI}$ is a logical "1", thereby permitting the parity signal to pass through the parity control AND gate 97 without change. However, if the interrupt register 93 is "set", the $\overline{HI}$ signal becomes a logical "0", causing the parity control AND gate 97 to indicate a parity error on the parity signal line of the interface bus 2. Operation would then proceed as described above.

Dual Processor Alternative Embodiment

Figure 3:
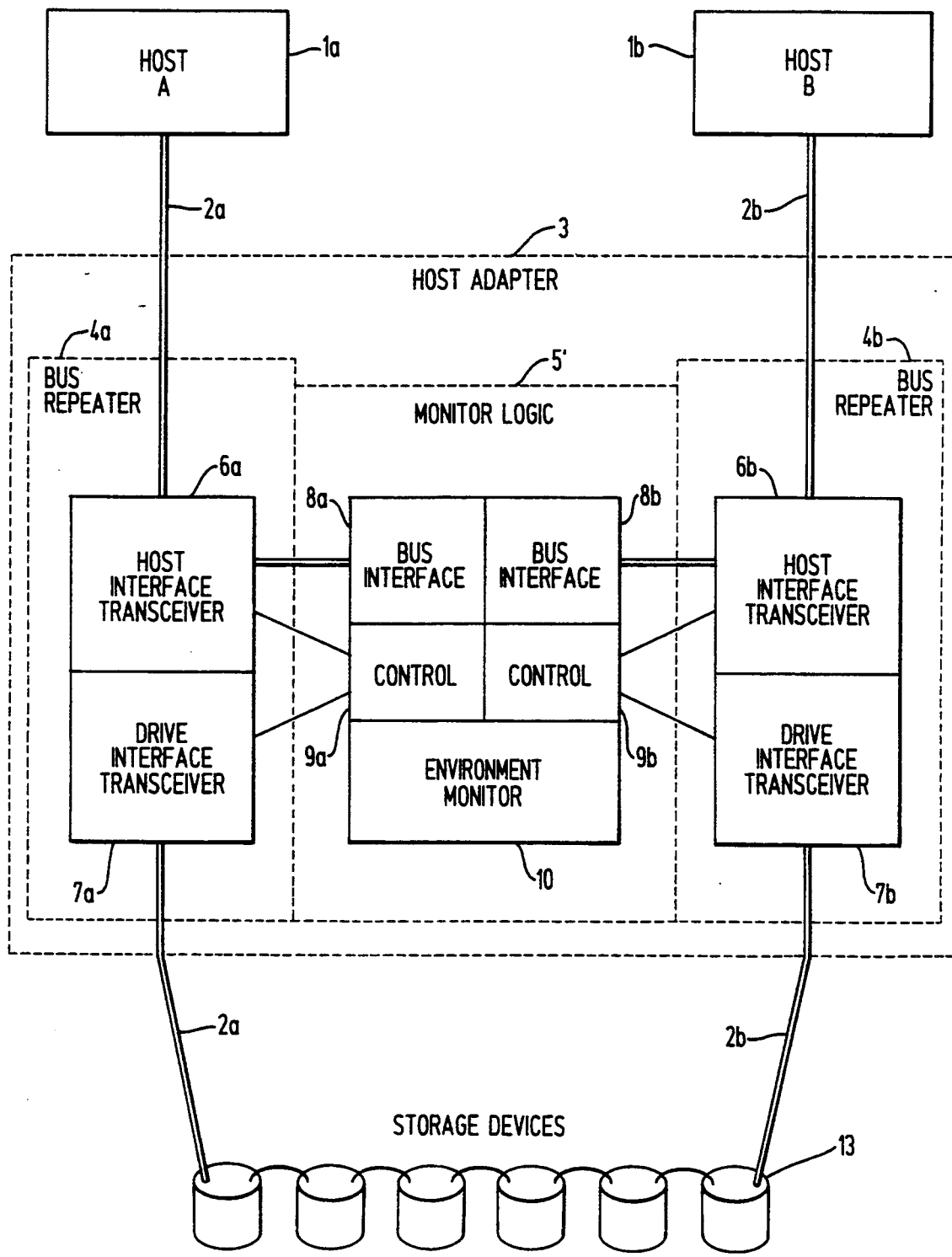
FIG. 3 is a block diagram of a dual-host processor version of the preferred embodiment of the present invention.

FIG. 3 shows essentially the same block diagram shown in FIG. 1, but with dual host processors 1a, 1b in a fault-tolerant configuration. Each of the host processors 1a, 1b is coupled by a standard interface bus 2a, 2b to a respective bus repeater 4a, 4b within a host adaptor 3. Each bus repeater 4a, 4b in turn is coupled to a dual monitor logic component 5'. The dual monitor logic component 5' preferably includes duplicate bus interfaces 8a, 8b, each coupled to a corresponding standard interface bus 2a, 2b, and duplicate control units 9a, 9b, each coupled to a corresponding bus interface 8a, 8b. Each of the duplicate control units 9a, 9b is also coupled to a corresponding host interface transceiver 6a, 6b and drive interface transceiver 7a, 7b within a corresponding bus repeater 4a, 4b. Each control unit 9a, 9b is further coupled to an environment monitor unit 10. The environment monitor unit 10 may be either a single, shared unit, or comprise redundant subunits.

The functions of the bus repeaters 4a, 4b and the monitor logic component 5' are the same as the corresponding components described with respect to FIG. 1. This configuration allows only 6 storage device ports when using a standard SCSI bus, but can achieve an economy of implementation by sharing parts of the monitor logic component 5', and provides for a fault-tolerant, dual-processor system.

In the preferred embodiment, the environment monitoring unit 10 is commonly shared, since there is only one common environment to monitor. Under this configuration, the host adapter 3 allows a special "split path" mode of operation. That is, a first host processor 1a may assert a Reset Signal followed immediately by a "Monitor Mode" command (or a signal asserted on a reserved signal line) to its attached control unit 9a in the host adapter 3. The attached control unit 9a disables the communications path between the first host processor 1a and the storage devices 13 and enables the communications path between the first host processor 1 a and its associated bus interface unit 8a, putting the "A" side of the system into Monitor Mode. Meanwhile, communication between the second host processor 1b and the storage devices 13 can continue in the Bypass Mode. Of course, the reverse connections are also possible. Hence, either host processor 1a, 1b can monitor the environment functions detected by the monitor logic component 5' while the other host processor 1a, 1b simultaneously continues communicating with the storage devices 13.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

We claim:

1. A system for monitoring the environment of at least one remote device attached to a host processor by means of an interface bus having a limited number of address ports, including:
 (a) a host processor;
 (b) a first interface bus, coupled to the host processor, and having a limited number of address ports;
 (c) at least one remote device;

(d) a second interface bus, coupled to at least one remote device;

(e) bus repeater means, coupled to the first and second interface buses, for communicating information between the first and second interface buses in a first mode of operation, and for blocking such communication in a second mode of operation;

(f) environment monitor means, for monitoring environment conditions relevant to at least one remote device;

(g) bus interface means, electrically coupled to the first interface bus and to the environment monitor means, for communicating environment information with the host processor over the first interface bus in the second mode of operation, and for blocking such communication in the first mode of operation;

(h) control means, electrically coupled to the environment monitor means, the bus repeater means, and the bus interface means, for switching the system between the first mode and the second mode of operation;

wherein the environment monitor means does not use any of the limited number of address ports of the first interface bus when the system is in the first mode of operation.

2. The system of claim 1, wherein the control means switches the system from the first mode to the second mode of operation in response to a reset signal from the host processor.

3. The system of claim 2, wherein the host processor recurringly asserts the reset signal in order to communicate with the environment monitor means.

4. The system of claim 2, wherein the reset signal is asserted by the host processor as a command over the first interface bus.

5. The system of claim 2, wherein the reset signal is asserted by the host processor over the first interface bus, followed by a monitor mode command over the first interface bus.

6. The system of claim 2, wherein the first interface bus includes a reserved signal line, and the reset signal is asserted by the host processor as a signal over the reserved signal line.

7. The system of claim 1, wherein the control means switches the system from the first mode to the second mode of operation in response to application of power to the system.

8. The system of claim 1, wherein the control means switches the system from the first mode to the second mode of operation in response to an abnormal environment condition monitored by the environment monitor means.

9. The system of claim 8, wherein the first and second interface buses include a parity signal line, and the control means is further coupled to each parity signal line and initiates a switch from the first mode to the second mode of operation by asserting a false parity error signal on the parity signal line.

10. An apparatus for monitoring the environment of at least one remote device attached to a host processor by means of an interface bus having a limited number of address ports, including:

(a) bus repeater means, having at least a first port and a second port, the first port being coupled to the host processor, and the second port being coupled to at least one remote device for communicating information between the first and second ports in a first mode of operation, and for blocking such communication in a second mode of operation;

(b) environment monitor means, for monitoring environment conditions of at least one remote device;

(c) bus interface means, coupled to the first port and to the environment monitor means, for communicating environment information with the host processor through the first port in the second mode of operation, and for blocking such communication in the first mode of operation;

(d) control means, coupled to the environment monitor means, the bus repeater means, and the bus interface means, for switching the apparatus between the first mode and the second mode of operation;

wherein the environment monitor means does not use any of the limited number of address ports of the interface bus when the apparatus is in the first mode of operation.

11. The apparatus of claim 10, wherein the control means switches the apparatus from the first mode to the second mode of operation in response to a reset signal from the host processor.

12. The apparatus of claim 11, wherein the host processor recurringly asserts the reset signal in order to communicate with the environment monitor means.

13. The apparatus of claim 11, wherein the reset signal is asserted by the host processor as a command over the interface bus.

14. The apparatus of claim 11, wherein the reset signal is asserted by the host processor over the interface bus, followed by a monitor mode command over the interface bus.

15. The apparatus of claim 11, wherein the interface bus includes a reserved signal line, and the reset signal is asserted by the host processor as a signal over the reserved signal line.

16. The apparatus of claim 10, wherein the control means switches the apparatus from the first mode to the second mode of operation in response to application of power to the apparatus.

17. The apparatus of claim 10, wherein the control means switches the apparatus from the first mode to the second mode of operation in response to an abnormal environment condition monitored by the environment monitor means.

18. The apparatus of claim 17, wherein the interface bus includes a parity signal line, and the control means is further coupled to the parity signal line and initiates a switch from the first mode to the second mode of operation by asserting a false parity error signal on the parity signal line.

19. A method for monitoring the environment of at least one remote device attached to a host processor by means of an interface bus having a limited number of address ports, including the steps of:

(a) communicating information between the host processor and at least one remote device in a first mode of operation, and blocking such communication in a second mode of operation;

(b) monitoring environment conditions of at least one remote device;

(c) communicating environment information with the host processor in the second mode of operation, and blocking such communication in the first mode of operation;

wherein none of the limited number of address ports of the interface bus are used for monitoring environment conditions when in the first mode of operation.

20. The method of claim 19, wherein switching from the first mode to the second mode of operation occurs in response to a reset signal from the host processor.

21. The method of claim 20, wherein the reset signal is recurringly asserted.

22. The method of claim 20, wherein the reset signal is asserted by the host processor as a command over the first interface bus.

23. The method of claim 20, wherein the reset signal is asserted by the host processor as a reset signal over the first interface bus, followed by a monitor mode command over the first interface bus.

24. The method of claim 20, wherein the first interface bus includes a reserved signal line, and the reset signal is asserted by the host processor as a signal over the reserved signal line.

25. The method of claim 19, wherein switching from the first mode to the second mode of operation occurs in response to a Power On signal.

26. The method of claim 19, wherein switching from the first mode to the second mode of operation occurs in response to an abnormal environment condition.

27. The method of claim 26, wherein the interface bus includes a parity signal line, and switching from the first mode to the second mode of operation is initiated by asserting a false parity error signal on the parity signal line.

28. A system for monitoring the environment of at least one remote device attached to a host processor by means of an interface bus having a limited number of address ports, including:
(a) a host processor;
(b) a first interface bus, coupled to the host processor, and having a limited number of address ports;
(c) at least one remote device;
(d) a second interface bus, coupled to at least one remote device;
(e) bus repeater circuit, coupled to the first and second interface buses, for communicating information between the first and second interface buses in a first mode of operation, and for blocking such communication in a second mode of operation;
(f) environment monitor circuit, for monitoring environment conditions of at least one remote device;
(g) bus interface circuit, coupled to the first interface bus and to the environment monitor circuit, for communicating environment information with the host processor over the first interface bus in the second mode of operation, and for blocking such communication in the first mode of operation;
(h) controller, coupled to the environment monitor circuit, the bus repeater circuit, and the bus interface circuit, for switching the system between the first mode and the second mode of operation;

wherein the environment monitor circuit does not use any of the limited number of address ports of the first interface bus when the system is in the first mode of operation.

29. The system of claim 28, wherein the controller switches the system from the first mode to the second mode of operation in response to a reset signal from the host processor.

30. The system of claim 29, wherein the host processor recurringly asserts the reset signal in order to communicate with the environment monitor circuit.

31. The system of claim 29, wherein the reset signal is asserted by the host processor as a command over the first interface bus.

32. The system of claim 29, wherein the reset signal is asserted by the host processor over the first interface bus, followed by a monitor mode command over the first interface bus.

33. The system of claim 29, wherein the first interface bus includes a reserved signal line, and the reset signal is asserted by the host processor as a signal over the reserved signal line.

34. The system of claim 28, wherein the controller switches the system from the first mode to the second mode of operation in response to application of power to the system.

35. The system of claim 28, wherein the controller switches the system from the first mode to the second mode of operation in response to an abnormal environment condition monitored by the environment monitor circuit.

36. The system of claim 35, wherein the first and second interface buses include a parity signal line, and the controller is further coupled to each parity signal line and initiates a switch from the first mode to the second mode of operation by asserting a false parity error signal on the parity signal line.

* * * * *